United States Patent
Kato et al.

[11] 3,975,081
[45] Aug. 17, 1976

[54] SIGNAL RECORDING SYSTEM

[75] Inventors: Makota Kato, Nagokakyo; Kosey Kamisaka, Hirakata; Yoshihiro Okino, Kyoto, all of Japan

[73] Assignee: Matsushita Electric Industrial Co., Ltd., Osaka, Japan

[22] Filed: May 9, 1975

[21] Appl. No.: 576,205

Related U.S. Application Data

[63] Continuation of Ser. No. 402,821, Oct. 2, 1973, abandoned.

[30] Foreign Application Priority Data

Oct. 4, 1972  Japan............................ 47-100019
Oct. 11, 1972  Japan............................ 47-102115
Oct. 13, 1972  Japan............................ 47-102920

[52] U.S. Cl. ............................................. 350/3.5
[51] Int. Cl.² ........................................... G03H 1/26
[58] Field of Search ..................... 350/3.5, 162 SF

[56] References Cited
UNITED STATES PATENTS

| | | |
|---|---|---|
| 3,578,845 | 5/1971 | Brooks et al....................... 350/3.5 |
| 3,758,187 | 11/1973 | Thomas et al. ..................... 350/3.5 |
| 3,812,496 | 5/1974 | Brooks............................... 350/3.5 |

*Primary Examiner*—Ronald J. Stearn
*Assistant Examiner*—Jon W. Henry
*Attorney, Agent, or Firm*—Stevens, Davis, Miller & Mosher

[57] ABSTRACT

An optical recording system for holographically recording one-dimensional information varying with time such as audio signals.

2 Claims, 6 Drawing Figures

SIGNAL RECORDING SYSTEM

This is a continuation of application Ser. No. 402,821, filed Oct. 2, 1973, now abandoned.

This invention relates to optical recording systems for recording one-dimensional information varying with time, for instance audio signals.

In the holography that has recently been developed as a promising method of recording, reproducing and processing picture information use is usually made of two-dimensional diffraction grating pattern as the carrier and the phase and amplitude modulation of the grating pattern is recorded as a hologram. On the other hand, one-dimensional information varying with time such as audio signals can be recorded and reproduced by using a one-dimensional diffraction grating pattern as the carrier.

Figure 1:
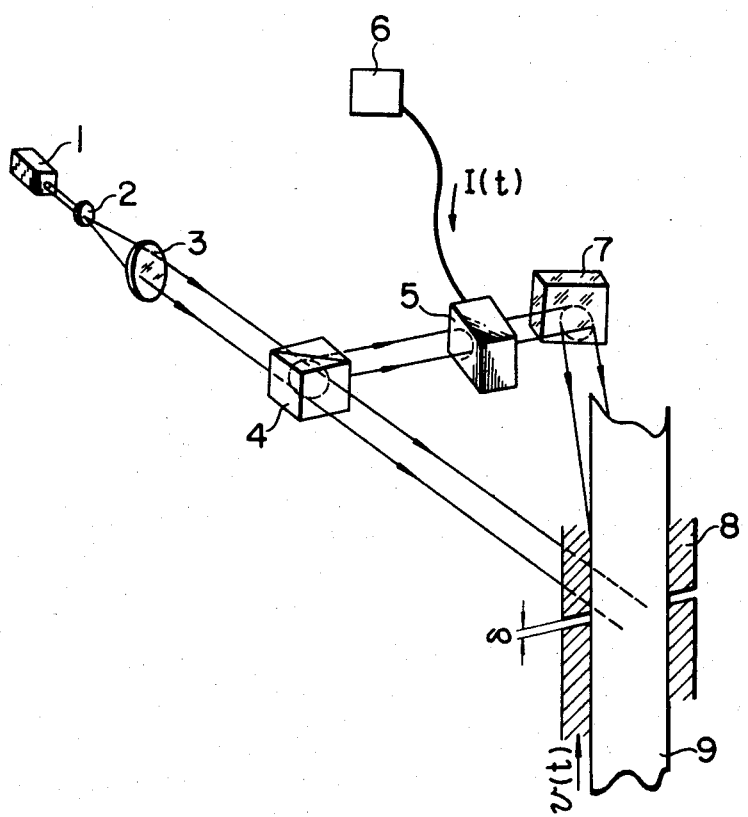
FIG. 1 is a schematic representation of a set-up for carrying out the prior art method of recording a signal varying with time.

FIG. 1 outlines a prior art signal recording system, in which a one-dimensional diffraction grating pattern is amplitude modulated with a signal I(t) varying with time for progressively recording the carrier modulation on a light-sensitive recording medium. In the Figure, numeral 1 designates a source of coherent light such as laser light, numerals 2 and 3 a collimator for obtaining a predetermined collimated light beam, numeral 4 a beam splitter, and numeral 5 a light modulator for modulating the coherent light beam with a signal I(t) supplied from a source 6 of signal varying with time. Numeral 7 designates a reflecting mirror, which is adjusted such that the modulated light beam reflected by it falls on a tape-like light-sensitive recording medium 9 in an overlapping relation to a reference light beam permitted through the beam splitter at a predetermined angle with respect to the reference light beam. Numeral 8 designates a slit having a width $\delta$. The modulated grating pattern modulated with the signal I(t) is progressively recorded substantially as a one-dimensional grating pattern on the film 9 through the slit 8 as the film 9 is fed at a constant speed V(t). This means that the signal I(t) is progressively recorded as it is converted according to the diffraction efficiency of the one-dimensional diffraction grating. To reproduce the signal, the tape bearing the signal recorded thereon is illuminated with coherent light as it is fed at a constant speed for photoelectric conversion of part of the diffracted light obtained through a slit disposed in the extreme proximity of the film.

In this method of recording signals varying with time, an inexpensive material such as vinyl tape may be used as the recording medium. Also, the duplication of the record may be made by means of thermal press transfer of the master tape pattern, which is suited to mass production. However, there has been no established method of forming a carrier for the recording signal, that is, the one-dimensional grating (or slit), nor any method of constructing the optical system for modulating the carrier. Therefore, various difficulties have been encountered in putting the above technique into practice. By way of example, in the case of recording a sinusoidal signal component at a frequency of 10 kHz as signal I(t) by feeding the film with the speed V(t) thereof set to 20 cm/sec, the length of the film corresponding to the period of one cycle of the signal I(t) is 20 microns. In such a case, the width of the slit is required to be as small as a fraction of 20 microns, for instance about 5 microns. This means that it is required in order to enable high fidelity recording of the signal, to dispose a very narrow slit substantially in contact with the film surface or to provide a construction that permits to obtain an equivalent effect. Also, although it is theoretically possible to simultaneously record in multiplex a plurality of different signals on the same recording medium by the above method, to this end it is necessary to provide the corresponding number of light modulators and also to provide a slit for each signal. This means extreme complications in the overall construction, and also particular expedients to meet the spatial requirements are necessary.

The present invention has for its primary object the provision of a signal recording system, which permits optical recording of signals varying with time on an inexpensive recording medium with high fidelity and also permits the recording of these signals in multiplex recording, and with which the afore-mentioned problems in the prior art can all be solved.

Figure 2:
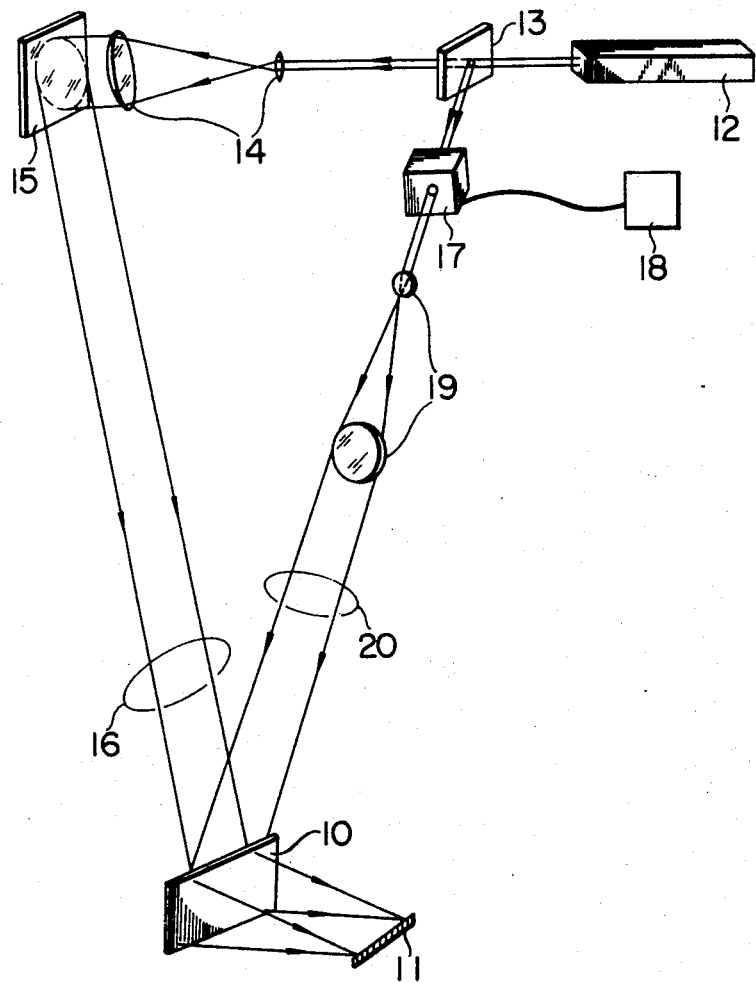
FIG. 2 is a schematic representation of a set-up for illustrating the principles underlying the invention.

The invention will now be described in connection with the drawing. FIG. 2 outlines the basic construction according to the invention. Referring to the Figure, numeral 12 designates a laser light source, numeral 13 a beam splitter, numeral 14 a collimator, and numeral 15 a reflecting mirror which can freely change the direction of the incident light beam. Numeral 16 designates a collimated coherent light beam reflected from the reflecting mirror 15, and which illuminates a holographic slit 10 prepared by a method to be described hereinafter for reproducing an image on a light-sensitive recordng medium. Meanwhile, the other light beam proceeding from the beam splitter 13 is amplitude modulated as it passes through a light modulator 17 with a signal supplied from a signal source 18, the modulated light beam being passed through a collimator 19 to produce a collimated light beam 20 illuminating the hologram 10. The incidence angles of the light beams 16 and 20 entering the hologram are adjusted such that the resultant two slit images reproduced from the hologram 10 overlap and form an interference pattern 11 in the form of a one-dimensional grating pattern. In the Figure, the part of the diffraction light from the halogram that does not participate in the formation of the interference pattern 11 is not shown and is designed not to fall upon the recording surface at the time of production of the holographic slit 10. Also, the light-sensitive recording medium which is not shown is arranged such that the pattern 11 is recorded on it.

Figure 3:
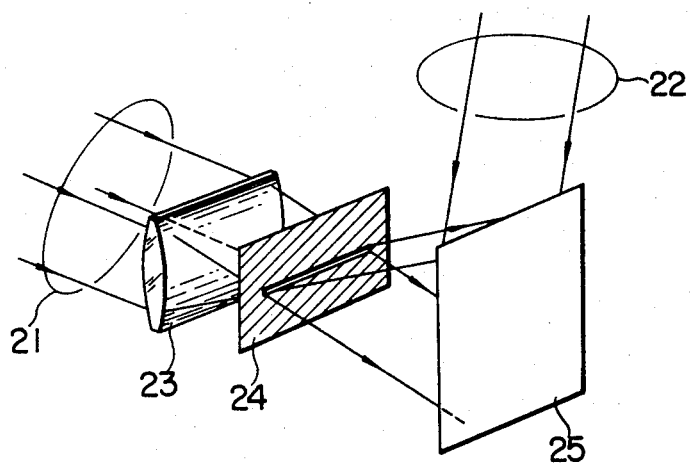
FIGS. 3, 4 and 5 show the method of preparing the holographic slit used in accordance with the invention.

The preparation of the holographic slit 10 shown in FIG. 2 will now be described with reference to FIGS. 3 and 4. In FIG. 3, numerals 21 and 22 designate coherent collimated light beams split from a light beam from the same coherent light source such as a laser light source. The light beam 21 is collected by a collecting lens 23 to illuminate a mechanical slit 24. The diffracted light from the slit 24 is recorded on a light-sensitive recording medium 25, for instance photoresist, as a hologram together with the reference light beam 22 in an overlapping relation thereto. This is the aforementioned holographic slit.

Figure 4:
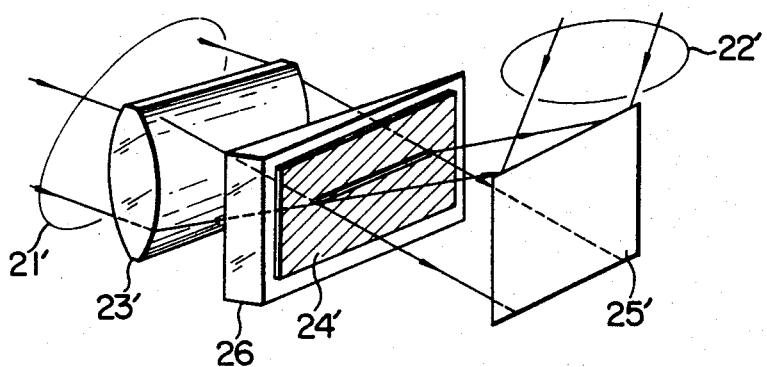

FIG. 4 shows an optical system for effecting multiple recording subsequent to the above recording process. The set-up of FIG. 4 is different from that of FIG. 3 in that a prism 26 is provided here. Other parts are designated by like reference numerals with a prime. In the case of FIG. 4, the incidence angle of the reference light beam 22' is different from that in case of FIG. 3, and the multiple recording is effected such that two slit images obtained by illuminating the hologram recorded in this way with two collimated coherent light beams from two different directions overlap to form a substantially one-dimensional diffraction grating pattern. The vertical angle of the prism 26 in the arrangement of FIG. 4 is designed by taking the pitch of the above one-dimensional grating into consideration.

If the multiple recording of the hologram of the same slit is effected $n$ times by using successively different carrier frequencies and successively replacing the prism 26 with prisms of different vertical angles, it is possible to obtain simultaneous recording of $(n-1)$ channel signals at the most, by modulating $(n-1)$ of $n$ slit images reproduced from the hologram and using the remaining slit image as the reference wave.

Figure 5:
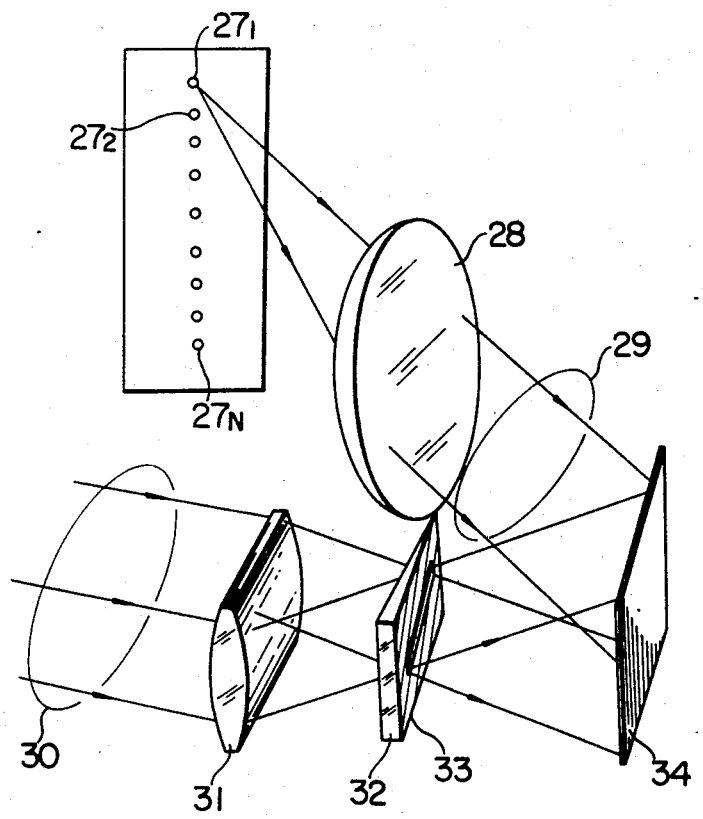

FIG. 5 shows an optical system for recording a hologram capable of simultaneous reproduction of $n$ slit images. Reference symbols $27_1, 27_2, \ldots, 27_n$ designate reference light sources, the collimated light beams from which are made to be incident on the hologram surface 34 at different incidence angles. Numeral 28 designates a collimator lens for rendering the light wave from each reference light source into a collimated light beam. Numeral 30 designates an illumination light beam coherent to the light beam from any reference light source, and it is collected by a collecting lens 31 and passes through a prism 32 and a slit 33. The diffraction light from the slit is recorded on the hologram surface 34 in an overlapping relation to the reference light beam 29. The multiple recording is effected by successively switching the reference light sources every time the prism 32 is replaced with a new one.

Figure 6:
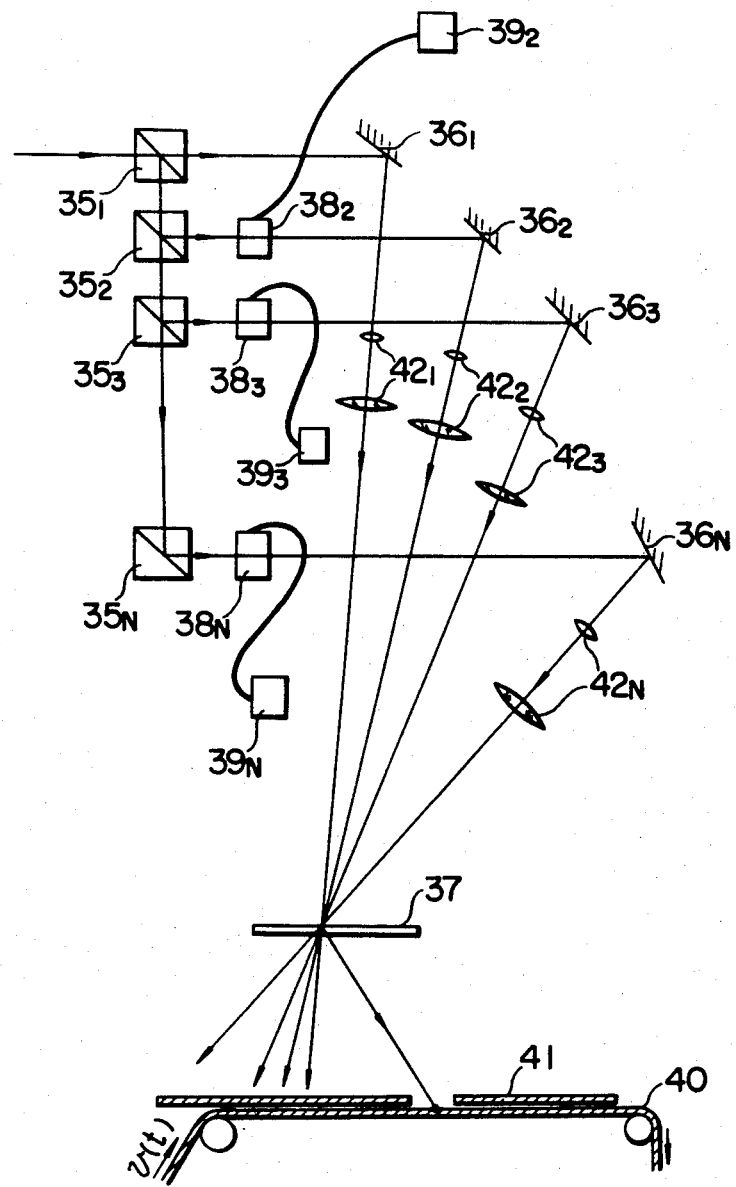
FIG. 6 is a schematic representation of an embodiment of the signal recording system according to the invention.

FIG. 6 shows a specific construction of the optical system for the multiple channel signal recording by using a hologram recorded in the above way. Beam splitters $35_1$ to $35_n$ and reflecting mirrors $36_1$ to $36_n$ are provided to produce the corresponding number of mutually coherent light beams, which are caused to be incident on a multiple recording hologram 37. Of the $n$ slit images reproduced from the hologram, $(n-1)$ images are amplitude modulated by respective light modulators $38_2, 38_3, \ldots, 38_n$ individually driven by separate signal sources $39_2, 39_3, \ldots, 39_n$. These amplitude modulated slit images are recorded on a light-sensitive recording medium 40 respectively in the form of one-dimensional diffraction grating pattern with the produced image due to the light beam not passing through any modulator as the reference wave. Numeral 41 designates a mask for blocking unnecessary diffraction light from the hologram 37, and symbols $42_1$ to $42_n$ designate collimators for expanding the respective light beams to a sufficient extent with respect to the area of the hologram 37.

In the recording of a number of signals varying with time with the system of above construction, it is possible to have a number of bright and very narrow slit images coherently overlap one another. Thus, it is readily possible to simultaneously record multiple channel signals on the same recording medium by using one of the split beams as the reference light and separately reproduce these signals. On the other hand, in the prior art method shown in FIG. 1 where the slit is disposed in direct contact with the recording medium, high frequency signal components cannot be recorded, and with a construction where a number of slit images are caused to overlap one another on the same recording surface through lenses and mirrors it is possible to simultaneously record only several channels at the most. Also, according to the invention the slit images are reproduced not through the focusing action of lens but through the lens action of the hologram, so that there is no limitation on the length of the slit and it is possible to use a long slit compared to those in case of the systems where the images are focused through lenses. Further, in the recording of multiple channel signals described above, it is possible to repress the cross talk among the individual signals and reduce distortion of the outputs due to non-linear characteristics of the recording material by setting the intensity of the reference light to several times to several ten times the maximum intensity of light of the other signals.

We claim:

1. A signal recording apparatus, comprising:
   means for generating a coherent light beam;
   means for splitting said coherent light beam into primary and secondary beams;
   means for modulating said secondary beam with a time varying signal;
   holographic slit means located at a position where said primary and second beams intersect, said holographic slit means comprising a recording medium having a plurality of slit images recorded thereon, said slit images being made by recording a plurality of pairs of interfering light beams onto said recording medium, one light beam of each pair of interfering beams directly illuminatng said recording medium, said direct illuminating beams having different angles of incidence at said recording medium relative to each other, a second light beam of each pair of interfering beams being projected through a mechanical slit onto said recording medium as a diffraction pattern of said mechanical slit, each of said second beams having different angles of incidence relative to each other at said slit with respect to the longitudinal direction of said mechanical slit;
   means projecting said primary beam through said holographic slit means and onto a moving recording medium as a reference beam; and
   means for projecting the modulated secondary beam through said holographic slit means and onto said moving recording medium;
   said primary and secondary beams having respective angles of incidence at said holographic slit means substantially the same as the angles of incidence of a pair of beams at said recording medium on which said holographic slit means has been recorded; and
   wherein a slit image reproduced from said holographic slit means by said reference beam and a slit image reproduced from said holographic slit means by said modulated secondary beam interference with each other to form an interference pattern recorded on said moving recording medium.

2. A signal recording apparatus according to claim 1, further comprising:
   means for splitting said coherent light beam into a plurality of secondary light beams;
   means for separately modulating each of said plurality of secondary beams with a time varying signal; and
   means for projecting each of said plurality of secondary beams through said hologram slit means at separate angles onto said moving recording medium to form a plurality of one-dimensional interference patterns with said primary beam on said moving recording medium.

* * * * *